(12) United States Patent
Mueller et al.

(10) Patent No.: US 8,148,290 B2
(45) Date of Patent: Apr. 3, 2012

(54) DIESEL EXHAUST TREATMENT SYSTEM CATALYST MONITORING

(75) Inventors: Torsten Wolfgang Mueller, Hannover (DE); Tilman Wolfram Beutel, Neshanic Station, NJ (US); Joseph Charles Dettling, Howell, NJ (US); Markus Kinne, Hannover (DE)

(73) Assignee: Basf Corporation, Florham Park, NJ (US)

( * ) Notice: Subject to any disclaimer, the term of this patent is extended or adjusted under 35 U.S.C. 154(b) by 527 days.

(21) Appl. No.: 11/426,792

(22) Filed: Jun. 27, 2006

(65) Prior Publication Data
US 2007/0298504 A1  Dec. 27, 2007

(51) Int. Cl.
*B01J 23/00* (2006.01)
*B01J 37/00* (2006.01)
*G01N 31/00* (2006.01)

(52) U.S. Cl. ............ 502/300; 502/104; 436/37

(58) Field of Classification Search .......... None
See application file for complete search history.

(56) References Cited

U.S. PATENT DOCUMENTS

| 5,941,928 | A | 8/1999 | Naber et al. | |
| 5,956,945 | A | 9/1999 | Kumar et al. | |
| 6,209,316 | B1 | 4/2001 | Duvinage et al. | |
| 6,293,093 | B1 | 9/2001 | Goralski et al. | |
| 6,301,881 | B1 * | 10/2001 | Kumar | 60/274 |
| 6,350,421 | B1 * | 2/2002 | Strehlau et al. | 423/213.2 |
| 6,363,713 | B1 | 4/2002 | Wu et al. | |
| 6,502,386 | B1 | 1/2003 | Mazur et al. | |
| 6,519,930 | B1 * | 2/2003 | Maus et al. | 60/274 |
| 7,055,311 | B2 * | 6/2006 | Beutel et al. | 60/285 |
| 7,374,729 | B2 * | 5/2008 | Chen et al. | 422/177 |
| 2003/0032188 | A1 | 2/2003 | Bailey et al. | |
| 2003/0061860 | A1 | 4/2003 | Hu et al. | |
| 2003/0198583 | A1 * | 10/2003 | Zhang | 423/215.5 |
| 2004/0033175 | A1 * | 2/2004 | Ohno et al. | 422/180 |
| 2004/0040287 | A1 | 3/2004 | Beutel et al. | |
| 2004/0219075 | A1 | 11/2004 | Hepburn et al. | 422/171 |
| 2005/0119117 | A1 * | 6/2005 | Yoshida et al. | 502/302 |
| 2005/0201916 | A1 * | 9/2005 | Yavuz et al. | 423/239.2 |
| 2005/0279156 | A1 | 12/2005 | He et al. | |
| 2006/0059900 | A1 * | 3/2006 | Harada et al. | 60/297 |
| 2006/0248874 | A1 | 11/2006 | Goersmann et al. | |
| 2007/0238605 | A1 * | 10/2007 | Strehlau et al. | 502/60 |
| 2007/0249495 | A1 * | 10/2007 | Gao et al. | 502/300 |

FOREIGN PATENT DOCUMENTS

| EP | 1 286 028 A2 | 2/2003 |
| EP | 1 286 028 A3 | 2/2003 |
| WO | WO2004/085314 | * 10/2004 |

OTHER PUBLICATIONS

PCT International Search Rpt; Date Completed—Jan. 25, 2008; performed by European Patent Office; by Authorized Officer- Marc Zebst.
W.B. Clemmens et al.; "Detection of Catalyst Performance Loss Using on—Board Diagnostics"; SAE Transactions Journal of Fuels & Lubricants, Warrendale, PA USA; vol. 99, 1990 pp. 43-60, XP 000579067 the whole document.
Non-Final Office Action in U.S. Appl. No. 12/484,307, mailed Dec. 3, 2009, 21 pgs.

* cited by examiner

*Primary Examiner* — Melvin Mayes
*Assistant Examiner* — Sheng H Davis
(74) *Attorney, Agent, or Firm* — Melanie L. Brown; Scott Serrilla; Diehl Serrilla

(57) ABSTRACT

Diesel exhaust treatment articles, systems and methods are disclosed. According to one or more embodiments, an oxygen storage component is utilized and degradation of the oxygen storage component is correlated with degradation of the hydrocarbon conversion efficiency of a catalyst in a diesel engine system.

20 Claims, 4 Drawing Sheets

DIESEL EXHAUST TREATMENT SYSTEM CATALYST MONITORING

FIELD OF THE INVENTION

Embodiments of the invention relate generally to diesel exhaust treatment system monitoring, and more particularly to diesel exhaust treatment systems and methods that include catalyst components which permit indirect monitoring of the function of catalysts in diesel engines.

BACKGROUND

Compression ignition diesel engines have great utility and advantage as vehicle power trains because of their inherent fuel economy and high torque at low speed. Diesel engines run at a high air to fuel (A/F) ratio under very fuel lean conditions. Because of this, they have very low emissions of gas phase hydrocarbons and carbon monoxide. However, diesel exhaust is characterized by relatively high emissions of nitrogen oxides ($NO_x$) and particulates. The particulate emissions, which are measured as condensed matter at 52° C., are multi phase being comprised of solid (insoluble) carbon soot particles, liquid hydrocarbons in the form of lube oil and unburned fuel, the so called soluble organic fraction (SOF), and the so called "sulfate" in the form of $SO_3+H_2O=H_2SO_4$.

Like in gasoline engine systems, pollution control devices are used in diesel engine systems to reduce pollutants. These devices, which include diesel oxidation catalysts (DOC) and particulate matter (PM) filters, for example, catalyzed soot filters (CSF), are installed in the exhaust system of the engine. As the catalyst which is responsible of hydrocarbon conversion ages, its ability to reduce combustion by-products, referred to as conversion efficiency, diminishes. These combustion by-products include, but are not limited to, carbon monoxide and hydrocarbons.

Various government agencies are requiring vehicles to be equipped with emission monitoring systems, which are commonly referred to as On-Board Diagnostic (OBD) systems, to notify the operator of the vehicle when the emissions exceed government allowed standards. It is required that a malfunction indicator light be turned on when levels of specific emissions exceed the standard by a designated factor. Current OBD requirements are targeted primarily at hydrocarbon (HC) and nitrogen oxides ($NO_x$) emissions.

Diesel vehicles in the United States must fulfill the United States Environmental Protection Agency EPA OBD II and California Air Resources Board (CARB) OBD II requirements meaning that hydrocarbon limits may not be exceeded according to their respective standards as measured during a Federal Test Procedure (FTP) test. In order to fulfill this requirement, the HC conversion needs to be monitored during vehicle operation. Since diesel emissions contain heavier, more condensable HC components than gasoline engine emissions, the heavy HC emissions can adsorb onto the catalyst at temperatures below light-off. Therefore, if HC levels are measured before and after the catalyst for diesel engines, it may appear that HC conversion is taking place when actually the post catalyst HC reduction is due to the HC being stored on the catalyst. Thus, it is not possible to estimate catalyst efficiency in a diesel engine accurately by monitoring HC after the catalyst.

Since there are no measures available to directly detect hydrocarbon emissions during vehicle operation, gasoline powered vehicles utilize an indirect measurement using a correlation between the oxygen storage capacity of the catalyst and its actual conversion performance for hydrocarbons. In gasoline engines that utilize three-way catalysts (TWC), the air to fuel ratio oscillates between fuel rich and fuel lean engine operating conditions. The oxygen storage component (OSC) contained in a three-way-catalyst has the catalytic purpose of maintaining stoichiometric conditions in the catalyst by releasing oxygen into the exhaust under fuel rich engine operating conditions and absorbing oxygen from the exhaust under fuel lean operating conditions. The OSC function thereby enables the optimal oxidation of HCs and CO during fuel rich operating conditions as well as reduction of $NO_x$ to $N_2$ under fuel lean operating conditions. The OSC functionality is, therefore, a pre-requisite for the efficient catalytic removal of HCs, CO, and $NO_x$ over a TWC under all engine operating conditions. At the same time, OSC ability to release or take up oxygen serves as a means to monitor the catalytic function of the TWC in gasoline OBD systems. This type of monitoring has not been applied so far for diesel engine systems because they are operated under constant fuel lean engine operating conditions making an OSC component unnecessary.

Therefore, current diesel oxidation catalysts are unable to fulfill the current US EPA/CARB OBD requirements because of the lack of ability to measure hydrocarbon conversion during vehicle operation. It would be desirable to provide exhaust treatment systems and methods for diesel engine systems that allowed for such monitoring of the performance of the diesel catalysts.

SUMMARY

According to an embodiment of the invention, a diesel engine exhaust treatment article is provided, which comprises a diesel catalyst including an oxygen storage component and a precious metal component adapted to convert carbon monoxide and hydrocarbons by oxidation, the oxygen storage component having a pre-selected deactivation temperature range that coincides with a deactivation temperature range of the precious metal component at which the hydrocarbon conversion of the precious metal component decreases below a pre-selected value. In certain embodiments, the diesel catalyst includes a diesel oxidation catalyst. According to one or more embodiments, the precious metal and the oxygen storage component are in close contact. In other embodiments, the precious metal and the oxygen storage component are separated.

The oxygen storage component may comprise ceria.

In certain embodiments, the oxygen storage component and precious metals are on separate substrates. In one or more embodiments, the catalyst comprises a catalyzed soot filter.

Another embodiment of the invention pertains to a diesel exhaust system comprising a diesel catalyst selected from a diesel oxidation catalyst and a catalyzed soot filter; a first lambda sensor located upstream of the diesel catalyst and a second lambda sensor located downstream from the diesel catalyst; and oxygen storage component located between the sensors. In certain embodiments, the oxygen storage component is located downstream from the from the diesel catalyst.

In one or more embodiments, the system includes a diesel oxidation catalyst. The diesel oxidation catalyst may according to one or more embodiments include a precious metal component on a substrate and an oxygen storage component on a substrate. The precious metal component and the oxygen storage component may be contained on the same substrate, where they may be in close contact or separated in different layers. Alternatively, the precious metal component and oxygen storage components may be on separate substrates.

According to certain embodiments, the first lambda sensor and second lambda sensor are in communication with an on board diagnostic system. The lambda sensors may be UEGO or HEGO sensors.

Another embodiment of the invention pertains to a method of monitoring the hydrocarbon conversion efficiency of a catalyst in a diesel engine system comprising passing an exhaust gas stream of a diesel engine through a diesel catalyst selected from a diesel oxidation catalyst and a catalyzed soot filter, the diesel catalyst capable of converting hydrocarbons by oxidation; measuring degradation of an oxygen storage component located in the path of the exhaust gas stream; and correlating the degradation of the oxygen storage catalyst with a decrease in hydrocarbon conversion efficiency. The method may further comprise activating an alarm when the hydrocarbon conversion efficiency decreases below a pre-selected value.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Figure 1:
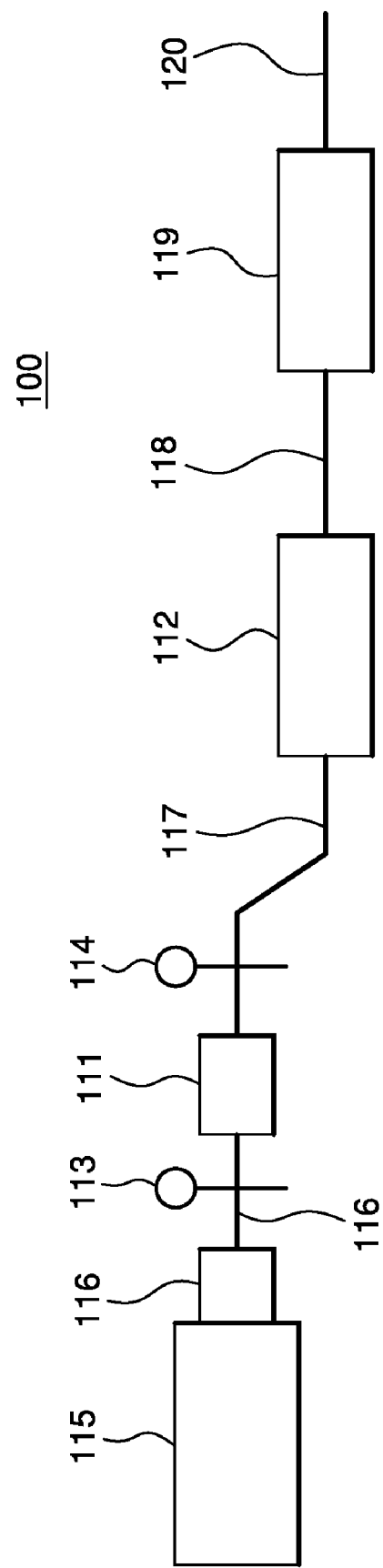
FIG. 1 is a schematic illustration of a diesel powered motor vehicle exhaust line in accordance with an embodiment of the invention.

An embodiment of the invention is depicted in FIG. 1. A diesel motor vehicle exhaust line 100 includes a diesel catalyst 111, which is typically a diesel oxidation catalyst including a precious metal component. Oxidation catalysts comprising a platinum group metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts, or more simply catalytic converters or catalyzers, which are placed in the exhaust train of diesel power systems to treat the exhaust before it vents to the atmosphere. Typically, the diesel oxidation catalysts are formed on ceramic or metallic carriers (such as the flow through monolith carriers described above) upon which catalytic washcoat compositions are deposited. The catalytic washcoats generally contain base metal catalytic agents, platinum group metal catalytic agents or combinations of both that are supported on refractory metal oxides, e.g., activated alumina. Preferred platinum group metal catalytic agents include platinum, palladium, and rhodium.

The exhaust line 100 shown in FIG. 1 may optionally include a particulate matter filter 112 such as a catalyzed soot filter. The exhaust line 100 further includes a first upstream lambda sensor 113, and a second downstream lambda sensor 114. The exhaust line can further include a diesel engine 115 and an engine exhaust manifold 116 connected through an upstream conduit 116 with the diesel catalyst 111. A downstream conduit 117 is connected to the diesel catalyst 111 and leads to the particulate matter filter 112. The particulate matter filter is typically and preferably connected to a muffler 119 through exhaust pipe 118. The muffler 119 is connected to a tail pipe 120 having a tail pipe outlet which opens to the environment.

An oxygen storage component is included in the exhaust line shown in FIG. 1. The oxygen storage component can be on the same substrate as the diesel catalyst 111, or it can be on a separate substrate. In embodiments when the oxygen storage component is on the same substrate, the oxygen storage component may be in close contact with the precious metal component. Alternatively, the oxygen storage component can be in a layer separated from the precious metal component, but still on the same substrate as the precious metal component. In embodiments in which the oxygen storage component is on a separate substrate, the substrates can be contained in the same can.

It will be understood that the configuration shown in FIG. 1 is just one example of a diesel exhaust system, and other configurations are within the scope of the invention. As one example, when the particulate matter filter 112 is a catalyzed soot filter that has the ability to convert hydrocarbons and carbon monoxide via oxidation to benign components. The diesel catalyst 111 may be eliminated, and the oxygen storage component can be placed in close proximity to the catalyzed soot filter. This can be accomplished by incorporating the oxygen storage component onto the same substrate as the catalyst soot filter, or the oxygen storage component can be on a separate substrate in close proximity to the catalyzed soot filter.

As another alternative to the configuration shown in FIG. 1, a selective catalytic reduction (SCR) catalyst may be placed between the diesel catalyst 111 and the particulate matter filter 112. Non-limiting examples of diesel exhaust lines are shown in commonly assigned U.S. Pat. No. 6,826,906, the entire content of which is incorporated herein by reference.

According to one or more embodiments, the lambda sensors can be heated exhaust gas oxygen (HEGO) or universal exhaust gas oxygen (UEGO) sensors. The first, upstream sensor can be a UEGO or HEGO sensor and second, downstream sensor can be a HEGO sensor. Either the delay time or the area between inlet and outlet signal can be measured. In the case of the delay time, the oxygen amount is given by the following formula:

$$OSC[mg] = \Delta\lambda * Flow[kg/h] * Dt[s] * 0.64 \qquad (1),$$

where OSC [mg] is the mass of oxygen released by the oxygen storage component upon transition from lean to rich engine operating conditions, $\Delta\lambda$ is the difference in lambda values measured before and after the catalyst, Flow denotes the intake air mass flow, and $\Delta t$ is the time delay between the lambda jump in front of and behind the catalyst measured upon transition from lean to rich.

Alternatively, the lambda signals can be integrated in order to calculate the mass of oxygen stored per catalyst unit volume using following formula:

$$O_2[g/l_{catalyst}] = \frac{\text{flow }[l/\text{min}]}{60[\text{sec/min}]} \cdot \frac{\int_{\lambda_{in} \leq 1}^{\lambda_{out} \leq \lambda_{in}} \left(\frac{\lambda_{out}}{\lambda_{in}} - 1\right) dt}{\text{catalyst volume}[l_{catalyst}]}. \qquad (2)$$

Figure 2:
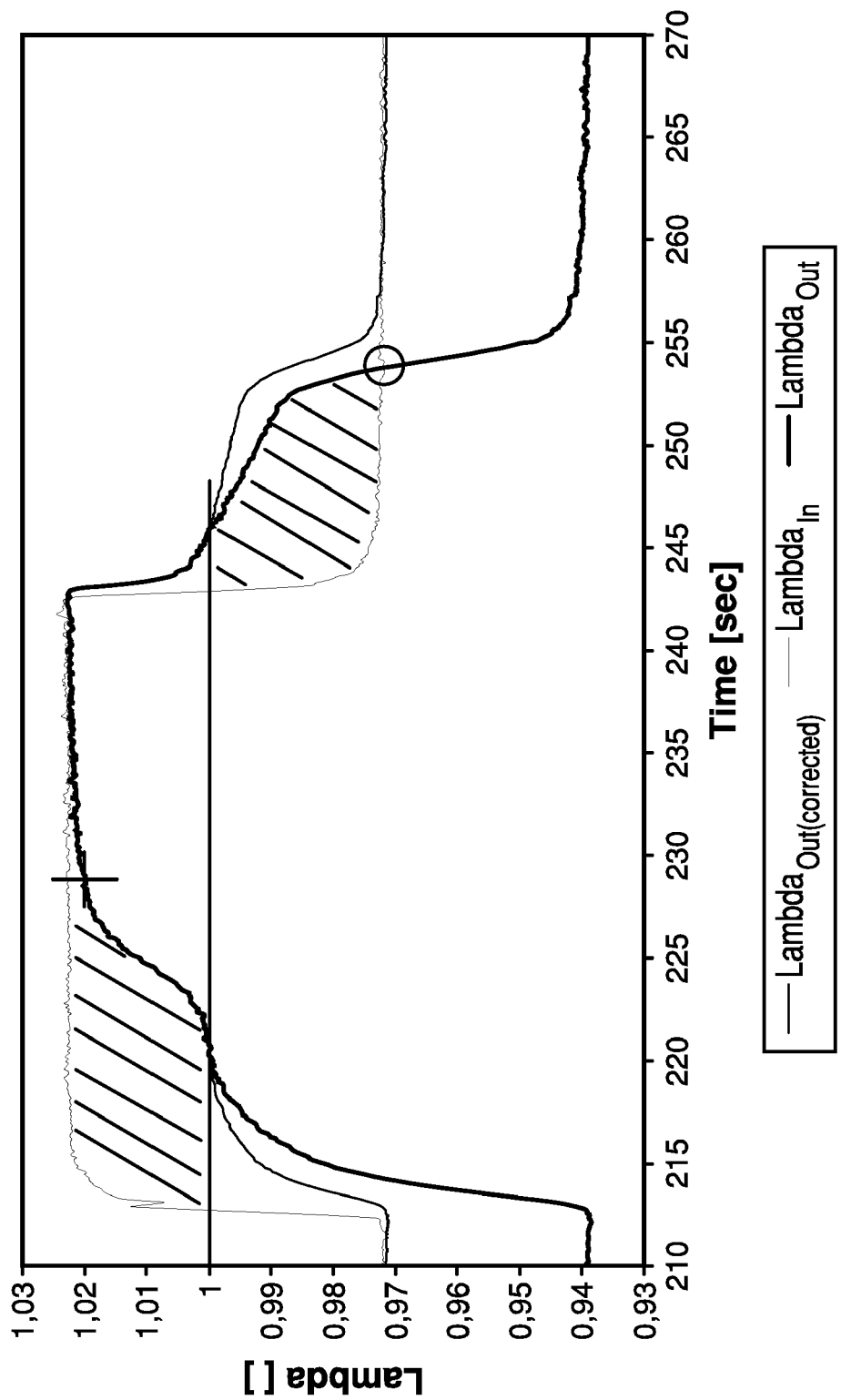
FIG. 2 is a graph illustrating the integration of the area included between the lambda traces upon transition from rich to lean and lean to rich.

-continued $$0, 23 \cdot \rho_{air}[g/l],$$

where $\rho_{air}$ is the density of air, and flow denotes the intake air mass flow, and $\lambda_{in}$ and $\lambda_{out}$ denote the lambda values measured in front of and behind the catalyst. An example for this alternative method according to formula (2) is shown in FIG. 2 to illustrate the integration of the area included between the lambda traces upon transition from rich to lean and lean to rich, respectively.

It will be understood that the time delay will depend on the upstream lambda sensor, the exhaust flow rate, the amount of OSC and the state of the OSC (fresh versus aged). Taking these factors into account, an algorithm can be implemented into the ECU that calculates the amount the oxygen storage capacity (g/L) from the lambda trace, intake air flow, and the time delay.

A catalyst soot filter typically comprises catalytic material deposited on a carrier of a type usually referred to as honeycombed or a monolith carrier comprising a unitary body, generally cylindrical in configuration, having a plurality of fine, substantially parallel gas flow passages or channels extending therethrough. When the channels are open-ended, the carrier is referred to as a "flow through" carrier. When each channel is blocked at one end of the carrier body, with alternate channels blocked at opposite end-faces the carrier is referred to as a wall-flow carrier (or filter). The wall-flow carrier as well as the catalytic material deposited thereon is porous so that exhaust gases can flow through the walls of the carrier (and without creating excessive backpressure on the engine). The monolithic carrier body is preferably comprised of ceramic-like materials such as cordierite, alumina, silicon nitride, zirconia, mullite, spodumene, alumina-silica-magnesia, silicon carbide or zirconium silicate. The catalyst coated or dipped or sprayed onto the carrier, (other than the composition) specifically mentioned above may be of a composition such as disclosed in assignee's U.S. Pat. No. 5,100,632 to Dettling et al., issued Mar. 31, 1992, entitled "Catalyzed Diesel Exhaust Particulate Filter" or even the catalyst composition utilizing zeolites disclosed in assignee's U.S. Pat. No. 5,804,155 to Farrauto et al., issued Sep. 8, 1998, entitled "Basic Zeolites as Hydrocarbon Traps for Diesel Oxidation Catalysts". Both the '632 and '155 patents are incorporated by reference herein for their disclosure of the catalyst compositions applied to the carrier of the CSF used in this invention. The diesel exhaust is a heterogeneous material which contains pollutants such as carbon monoxide (CO), unburned hydrocarbons (HC), nitrogen oxides (NOx) as well as soot particles. Soot particles compose both a dry, solid carbonous fraction and a soluble organic fraction. The soluble organic fraction is sometimes referred to as a volatile organic fraction (VOF or SOF) which may exist in diesel exhaust either as a vapor or as aerosol (fine droplets of liquid condensate) depending on the temperature of the exhaust gas. The catalyst on the CSF oxidizes the VOF retarding or minimizing CSF blockage or inhibiting decrease in permeability of the wall-flow filter's channels.

The soot filter also oxidizes HC and CO to convert these pollutants into "benign" emissions. The gases produced from the oxidation of VOF are generally non-polluting and do not materially interfere with or block the active sites of the CSF catalyst.

In one or more embodiments, the loading of precious metal coating on the CSF is in the range of at least 1 g/ft$^3$ and not less than about 100 g/ft$^3$. Suitable SCR catalysts which may be used in accordance with embodiments of the present invention include assignee's ZNX SCR catalyst. Other nitrogen reducing SCR catalyst compositions such as are disclosed in assignee's U.S. Pat. No. 4,961,917 to Byrne, issued Oct. 9, 1990, entitled "Method for Reduction of Nitrogen Oxides with Ammonia using Promoted Zeolite Catalysts" or the staged catalyst composition disclosed in assignee's U.S. Pat. No. 5,516,497 to Speronello et al., issued May 14, 1996, entitled "Staged Metal-Promoted Zeolite Catalysts and Method for Catalytic Reduction of Nitrogen Oxides Using the Same", may be employed. The '917 and '497 patents are incorporated herein by reference in their entirety. Generally, the '917 and '497 patents disclose a catalyst composition of zeolite, a promoter selected from the group consisting of iron and copper and a refractory binder. A vanadium-titania catalyst may also be acceptable and a typical composition of such catalyst may be found in U.S. Pat. No. 4,833,113, incorporated by reference herein.

The oxygen storage component preferably contains at least one oxide of a metal selected from the group consisting of rare earth metals and most preferably a cerium compound or praseodymium compound (praseodymia) with the most preferred oxygen storage component being cerium oxide (ceria). Preferably the oxygen storage component is in bulk form. By bulk form it is meant that a composition is in a solid, preferably as fine particles which can be as small as 1 to 15 microns in diameter or smaller, as opposed to being dispersed in solution in the base metal washcoat.

In some embodiments, it is advantageous to utilize a bulk fine particulate material of co-formed ceria-zirconia composite as an oxygen storage component as described in U.S. Pat. No. 5,057,483. These particles do not react with stabilized alumina washcoat and maintain a BET surface area of above 40 m$^2$/g upon exposure to 900° C. for a long period of time. Ceria is preferably dispersed homogeneously throughout the zirconia matrix from about 15 to about 85 weight % of the total weight of the ceria-zirconia composite to form a solid solution. The co-formed (e.g. co-precipitated) ceria-zirconia particulate composite can enhance the ceria utility in particles containing a ceria-zirconia mixture. The ceria acts as the oxygen storage component while zirconia stabilizes the dispersion of ceria. The '483 patent discloses that neodymium and/or yttrium can be added to the ceria-zirconia composite to modify the resultant oxide properties as desired.

In one or more embodiments, the amount of oxygen storage component is present in an amount sufficient so that the catalyst's deterioration in its oxygen storage capacity can be correlated with the deterioration in diesel catalyst's ability to convert hydrocarbons and/or carbon monoxide. For example, when the diesel catalyst's ability to reduce hydrocarbons or carbon monoxide in the exhaust stream falls below a certain predetermined or pre-selected level, there is also an decrease in the delay time between the lambda signals measured upstream and downstream of the catalyst which is detected by the OBD system due to the deteriorated oxygen storage capacity. The oxygen storage component may have a pre-selected deactivation temperature range that coincides with a deactivation temperature range of the precious metal component at which the hydrocarbon conversion of the precious metal component decreases below a pre-selected value. This correlation can therefore be achieved by calibration of the deterioration of the OSC with the deterioration of the diesel catalyst performance. The OBD system can then provide a signal or alarm to the vehicle operator indicating the need for exhaust system maintenance.

Catalytic layers are formed from catalytic washcoat compositions. Preferred catalytic washcoat compositions contain platinum group metal components as catalytic agents and a support of a refractory metal oxide such as activated alumina. Preferred catalytic washcoat compositions contain oxygen storage components and zirconia components. In addition, each catalytic composition can optionally contain an alkaline earth metal as a stabilizer, an iron or nickel component as a sulfide suppressing agent, and a rare earth metal component selected from the group consisting of lanthanum or neodymium components as a promoter.

Useful catalytic agents include at least one of the platinum group metal components, i.e., palladium, platinum, rhodium, ruthenium, and iridium components, with platinum, palladium and/or rhodium being preferred. Catalytic agents are typically used in amounts of up to 300 g/ft$^3$, and preferably from about 3 to 250 g/ft$^3$ depending on the metal. Amounts of platinum group metal components are based on weight divided by carrier volume, and are typically expressed in grams of material per cubic foot.

As will be apparent to those of ordinary skill in the art, the platinum group metal components, acting as catalytic agents, can exist in the catalyst in multiple oxidation states while in use. By way of example, a palladium component can exist as palladium metal, Pd (II), and Pd(IV) in the catalyst. According to one method of preparing the catalyst, a platinum group metal component such as a suitable compound and/or complex of the platinum group metals can be utilized to achieve dispersion of the catalytic component on a support, e.g., activated alumina support particles. As used herein, the term "platinum group metal component" means any platinum group metal compound, complex, or the like which, upon calcination or use of the catalyst decomposes or otherwise converts to a catalytically active form, usually, the metal or the metal oxide. Water soluble compounds or water dispersible compounds or complexes of platinum group metals can be utilized as long as the liquid used to impregnate or deposit the catalytic metal compounds onto support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of the platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the platinum group metal or a compound thereof.

Useful catalytic supports can be made of high surface area refractory oxide supports. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Preferably, the activated alumina has a specific surface area of 60 to 300 m$^2$/g.

The oxygen storage component described above can be included in the catalytic washcoats by dispersing methods known in the art. One method includes impregnation onto the composition by impregnating the oxygen storage component onto the support such as a platinum group metal containing support in the form of an aqueous solution, drying and calcining the resulting mixture in air to give a catalytic layer which that contains an oxide of the oxygen storage component in intimate contact with the catalytic agent. Examples of water soluble or dispersible, decomposable oxygen storage components that can be used include, but are not limited to water soluble salts and/or colloidal dispersions of cerium acetate, praseodymium acetate, cerium nitrate, praseodymium nitrate, etc. U.S. Pat. No. 4,189,404 discloses the impregnation of alumina-based support composition with cerium nitrate.

In another method, the oxygen storage component in the catalytic washcoat composition can be a bulk oxygen storage composition comprising an oxygen storage component which is preferably ceria, and/or praseodymia in bulk form. Ceria is most preferred. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles.

Additionally, the catalytic washcoat composition can contain a compound derived from zirconium, preferably zirconium oxide. The zirconium compound can be provided as a water soluble compound such as zirconium acetate or as a relatively insoluble compound such as zirconium hydroxide, both of which upon calcining are converted to the oxide. There should be an amount sufficient to enhance the stabilization and promotion of the catalytic washcoat compositions.

Stabilizers can be included in the catalytic washcoat compositions. Stabilizers can be selected from at least one alkaline earth metal component derived from a metal selected from the group consisting of magnesium, barium, calcium and strontium, preferably strontium and barium. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides. In the catalytic layer compositions, the amount of stabilizer combined with the alumina can be from 0.05 to 30 weight percent, preferably from about 0.1 to 25 weight percent, based on the total weight of the combined alumina, stabilizer and platinum group metal component.

The catalytic washcoat compositions optionally contain at least one promoter selected from the group consisting of lanthanum metal components and neodymium metal components with the preferred components being lanthanum oxide (lanthana) and neodymium oxide (neodymia). While these compounds are known to act as stabilizers for the alumina support, their primary purpose in the compositions of the present invention is to act as reaction promoters. A promoter is considered to be a material which enhances the conversion of a desired chemical to another. In a diesel catalyst such as a DOC, the promoter enhances the catalytic conversion of carbon monoxide and hydrocarbons into water and carbon dioxide and nitrogen oxides into nitrogen and oxygen.

When present, the lanthanum and/or neodymium components are preferably formed from precursors, such as soluble salts including acetates, halides, nitrates, sulfates and the like. The solution of the soluble promoters are preferably used to impregnate the solid components for their conversion to oxides after calcination. Preferably the promoter is in intimate contact with other components in the composition including and in particular, the platinum group metal component.

The catalytic layer compositions of the present invention can contain other conventional additives such as sulfide suppressants, e.g., nickel or iron components. Nickel oxide is an example of a sulfide suppressant and if used is present in an amount from about 1 to 25% by weight of the base metal undercoat.

The catalytic washcoats of the present invention can be made by any suitable method. One preferred method includes preparing a mixture of at least one water-soluble or dispersible, platinum group metal component and a finely-divided, high surface area, refractory oxide which is sufficiently dry to absorb essentially all of the solution to form a supported platinum group metal component. If more than one platinum group metal component is used in the catalytic washcoat composition, the additional platinum group metal component(s), can be supported on the same or different refractory oxide particles as the first platinum group metal component.

Thus, embodiments of the invention comprise a diesel catalyst that contains precious metal components as active components, a support material as carrier for the precious metals and zeolites as hydrogen storage materials. An oxygen storage component is provided, which in some embodiments is in close contact with the precious metal component. This is achieved through a correlation between the thermal deactivation of the oxygen storage component function and that of the precious metal function. The oxygen storage capacity of the OSC can be measured by applying a pulse of rich exhaust gas and determining the time lag of the lambda response measured in front of (upstream) and behind (downstream) the diesel catalyst. In experiments discussed below, the CO/HC oxidation activity can be measured in light-off experiments and/or dynamic vehicle tests.

Since this function can be designed in a way that correlates with the ability of the diesel catalyst to convert hydrocarbons, such conversion can be measured by an indirect method. A relationship between oxygen storage capacity and hydrocarbon conversion is provided which can be used for the online monitoring on vehicle.

According to one or more embodiments, to achieve a correlation between the thermal deactivation of the OSC and precious metal functions, the oxygen storage component is selected so that the temperature window of its deactivation coincides with the temperature window of the deactivation of the precious metal function in the diesel catalyst. While the embodiment of the diesel exhaust line shown in FIG. 1 includes a diesel oxidation catalyst, it will be understood that other catalysts can be used. According to one or more embodiments, the concept of indirect monitoring of the deterioration of the catalytic activity of the diesel catalyst is generally applicable to diesel exhaust gas aftertreatment systems including NSR (NOx storage reduction) and SCR (Selective Catalytic Reduction) catalysts. It is possible that the concept of indirect monitoring disclosed herein can be extended to monitor not only the CO/HC oxidation function of a particular catalyst system, but also the NOx reduction function in diesel exhaust aftertreatment systems. This could be achieved by establishing an analogous correlation between the thermal degradation of the OSC function and that of the NOx reduction function of a particular NOx reduction catalyst (NSR, SCR).

The following United States patents are incorporated by reference herein and made a part hereof. Specifically, the compositions of the catalysts disclosed in the following patents and how the compositions are made and/or applied to the disclosed filter or SCR catalysts are incorporated herein by reference in their entirety: U.S. Pat. No. 4,833,113; U.S. Pat. No. 4,961,917; U.S. Pat. No. 5,100,632; and U.S. Pat. No. 5,804,155. While the catalysts disclosed in the patents incorporated by reference herein may be used in the present invention, they do not, per se, or, in and of themselves, form the present invention.

The following examples further illustrate the present invention, but of course, should not be construed as in any way limiting its scope.

EXAMPLE 1

Preparation and Testing of Samples Containing OSC

A testing matrix was set up where the amount, the type and the location of an oxygen storage component (ceria) in different layers were varied. Each sample included a bottom coat and a top coat as described further below. Five samples were prepared as follows:

A-No OSC
B-OSC1 Sep. (Ceria 1 in bottom coat only)
C-OSC1 Comb. (Ceria 1 in bottom coat and top coat)
D-OSC2 Comb. (Ceria 2 in bottom coat and top coat)
E-OSC2 Sep. (Ceria 2 in bottom coat only)

The two different ceria materials were commercially available, pure ceria having a surface area of between 200 $m^2/g$ and 250 $m^2/g$. Ceria 1 was a lower surface area ceria and Ceria 2 was a higher surface area ceria.

Preparation of Washcoats:

Preparation of Bottom coat: An alumina (e.g. silica-doped alumina) is dispersed in water and acid (e.g. acetic acid) and milled to a particle size of approximately 10 micrometer. Zeolite (e.g. zeolite Beta) and the ceria containing OSC and binder (e.g. zirconyl acetate) are added sequentially to the slurry and mixed with the slurry. The slurry, containing 1.5 $g/in^3$ silica alumina having a surface area of 100 $m^2/g$, 0.5 $g/in^3$ zeolite H-Beta, 0.5 $g/in^3$ ceria and 0.1 $g/in^3$ $ZrO_2$ (as acetate), was coated onto a carrier substrate. The bottom washcoat layer did not contain any precious metals. After coating the slurry is coated onto a monolith, it was dried (at 110° C. in air) and calcined (at 450° C. in air).

This procedure was followed for samples B, C, D and E containing the respective ceria samples noted above. The bottom coat for sample A was prepared as described above, except that ceria was eliminated.

Preparation of Top Coat Containing Ceria (Samples C, D):

An alumina (e.g. silica-doped alumina) is impregnated with an aqueous Pt solution (containing a Pt precursor such as amine stabilized hydroxy Pt IV complex or Platinum nitrate or Pt tetra amine nitrate) to fill part of the pore volume. The Pt-impregnated alumina frit is then impregnated with an aqueous solution of Pd (containing a Pd precursor such as Palladium nitrate or Pd tetra amine nitrate) to fill the pores of the alumina support to incipient wetness. The Pt—Pd-alumina frit is subsequently dispersed in water to prepare a slurry and stirred. After the addition of a suitable binder (e.g. zirconyl acetate), the particle size of the alumina slurry is decreased by a milling process. The ceria containing OSC is subsequently added to the slurry and mixed with the slurry. A top washcoat, containing 1.5 g/in$^3$ silica alumina having a surface area of 100 m$^2$/g as a precious metal support, 0.5 g/in$^3$ zeolite H-Beta, 0.5 g/in3 ceria and Pt and Pd in a 2:1 ratio, was coated over the bottom washcoat. 0.05 g/in$^3$ of ZrO$_2$ (as acetate) was used as a binder and to stabilize the PM phase against sintering. After coating the slurry onto a substrate, the substrate is dried (110° C. in air) and calcined (450° C. in air).

Top Coat Not Containing Ceria (Samples A, B, E)

The procedure above for the Top Coat containing ceria was followed, except that ceria was eliminated from the procedure.

Figure 3:
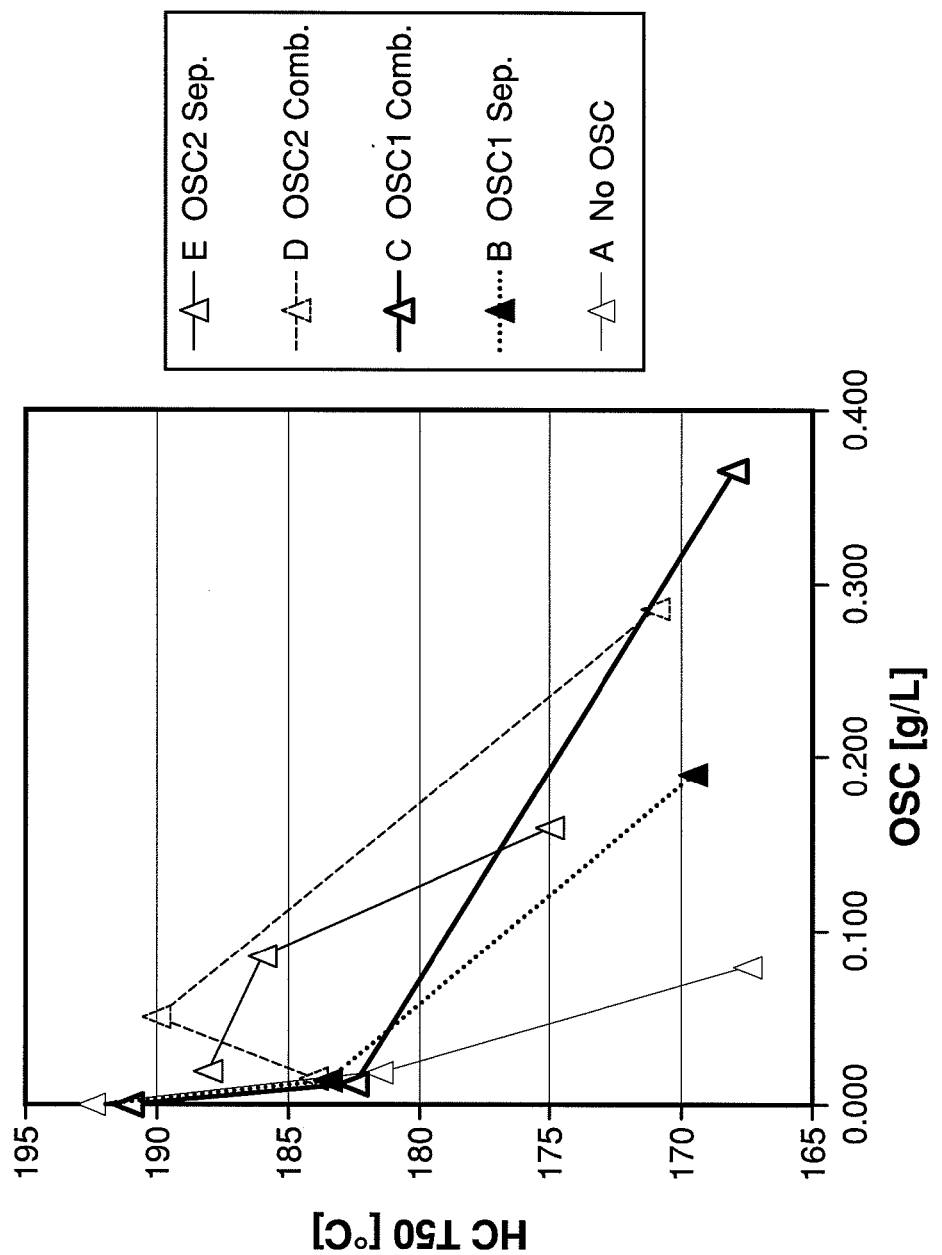
FIG. 3 is a graph showing the correlation between oxygen storage capacity of an oxygen storage component and HC light off for several samples.

The five samples were tested in a lab reactor, and the results are shown in FIG. 3. In particular, the samples with the precious metal in close contact with the oxygen storage component by combining precious metal and OSC in the top coat (samples C and D) showed a detectable correlation between oxygen storage capacity and light off. The sample with no OSC (sample A) and the samples in which the OSC was contained only in the bottom coat and separated from the precious metals (Samples B and E) showed a less detectable correlation between oxygen storage capacity and light off.

EXAMPLE 2

FTP Emissions Cycle Tests

Figure 4:
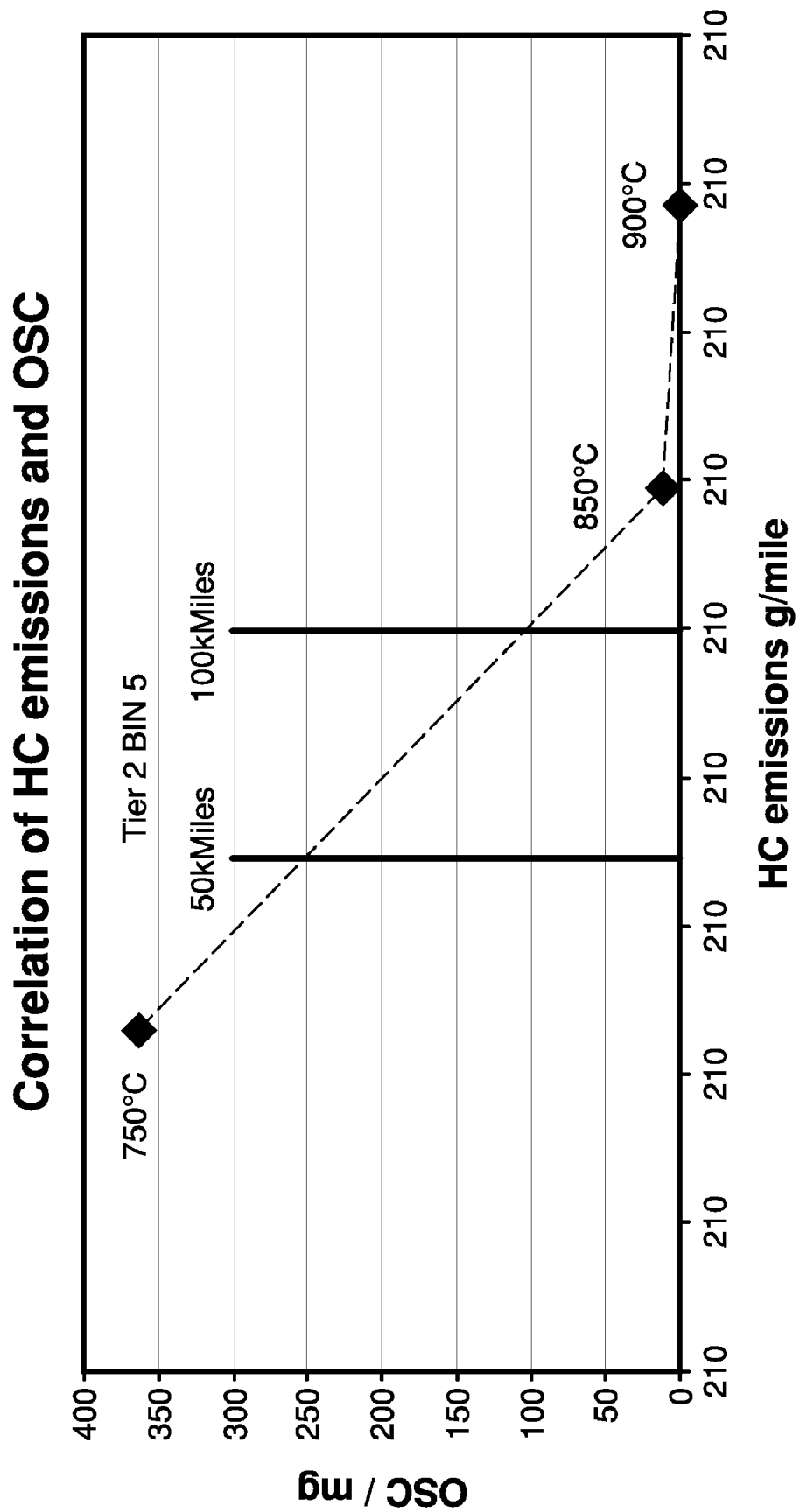
FIG. 4 is a graph showing the correlation between oxygen storage capacity and HC emissions for samples aged at three different temperatures.

To verify and support the data obtained on the lab reactor shown in FIG. 3, additional FTP emissions cycle tests were carried out. Two samples from Example 1 made in accordance with procedures for OSC 1/PM Combined and aged at 750° C. and 850° C. were measured on a dynamic engine bench (2.2 liter common rail engine). The results are presented in FIG. 4. The sample aged at 750° C. shows an acceptable HC performance (clearly below the Tier 2 BIN 5 emission standard) and a high oxygen storage capacity, while the sample aged at 850° C. has a poor HC performance and only a very small oxygen storage capacity. Thus, a very good correlation between the aging of the sample (measured as decreasing HC performance) and the OSC function of the catalysts can be established by proper selection of the OCS material and the design of the catalyst.

While the foregoing is directed to embodiments of the present invention, other and further embodiments of the invention may be devised without departing from the basic scope thereof, and the scope thereof is determined by the claims that follow.

What is claimed is:

1. A diesel engine exhaust treatment article comprising:
a diesel catalyst including an oxygen storage component and a precious metal component adapted to convert under constant fuel lean conditions carbon monoxide and hydrocarbons in a diesel engine exhaust stream by oxidation, the oxygen storage component having a preselected deactivation temperature range that coincides with a deactivation temperature range of the precious metal component at which the hydrocarbon conversion of the precious metal component in the diesel exhaust stream decreases below a pre-selected value, wherein the oxygen storage component is present in an amount sufficient so that reduction in the oxygen storage capacity of the diesel catalyst can be correlated with reduction in the ability of the diesel catalyst to convert hydrocarbons and/or carbon monoxide.

2. The article of claim 1 wherein the diesel catalyst includes a diesel oxidation catalyst.

3. The article of claim 2 wherein the precious metal and the oxygen storage component are in close contact.

4. The article of claim 3, wherein the pre-selected value is based on a hydrocarbon emission standard.

5. The article of claim 4, wherein the pre-selected value is determined based on measurement of thermally aged hydrocarbon conversion of the precious metal component and thermally aged oxygen storage capacity of the oxygen storage component.

6. The article of claim 3, wherein the oxygen storage component comprises ceria having a surface area in the range of about 200 m$^2$/g and 250 m$^2$/g.

7. The article of claim 6, wherein the oxygen storage component and the precious metal component are in contact in a washcoat layer.

8. The article of claim 7, wherein the diesel oxidation catalyst comprises two washcoat layers, and each washcoat layer contains ceria.

9. The article of claim 8, wherein the oxygen storage component comprises ceria having a surface area in the range of about 200 m$^2$/g and 250 m$^2$/g.

10. The article of claim 8, wherein one of the washcoat layers is coated over the other washcoat layer.

11. The article of claim 10, wherein the other of the washcoat layer does not contain a precious metal component and the washcoat layer coated over the other washcoat layer contains a precious metal component.

12. The article of claim 11, wherein the precious metal component comprises platinum.

13. The article of claim 12, wherein platinum and palladium are present in a ratio of 2:1 of platinum to palladium.

14. The article of claim 13, wherein the washcoat layer coated over the other washcoat layer comprises zeolite and a binder.

15. The article of claim 14, wherein the platinum and palladium are supported on an alumina support.

16. The article of claim 15, wherein the other washcoat layer comprises about 1.5 g/in$^3$ alumina having a surface area of about 100 m$^2$/g, about 0.5 g/in$^3$ zeolite, and about 0.5 g/in$^3$ ceria, and the washcoat layer coated over the other washcoat layer comprises about 1.5 g/in$^3$ alumina having a surface area of about 100 m$^2$/g as a precious metal support, about 0.5 g/in$^3$ zeolite, and about 0.5 g/in$^3$ ceria.

17. The article of claim 2 wherein the precious metal and the oxygen storage component are separated.

18. The article of claim 17 wherein the oxygen storage component and precious metals are on separate substrates.

19. The article of claim 2 wherein the oxygen storage component comprises a compound selected from the group consisting of ceria, praseodymia and mixtures thereof.

20. The article of claim 1 wherein the catalyst comprises a catalyzed soot filter.

* * * * *